United States Patent [19]

Oltmanns, Jr. et al.

[11] 4,393,963
[45] Jul. 19, 1983

[54] DISC BRAKE CALIPER SUPPORT

[75] Inventors: Roger W. Oltmanns, Jr., South Bend; Larry A. Portolese, Granger, both of Ind.

[73] Assignee: The Bendix Corporation, Southfield, Mich.

[21] Appl. No.: 412,745

[22] Filed: Aug. 30, 1982

Related U.S. Application Data

[63] Continuation of Ser. No. 191,188, Sep. 26, 1980, abandoned.

[51] Int. Cl.$^3$ ............................................. F16D 65/02
[52] U.S. Cl. ................................ 188/73.45; 188/73.35
[58] Field of Search ............... 188/73.31, 73.35, 73.43, 188/73.45, 73.46; 267/140.1, 140.3, 140.4

[56] References Cited

U.S. PATENT DOCUMENTS

| | | | |
|---|---|---|---|
| 1,936,389 | 7/1932 | Hallquist | 267/140.4 |
| 4,084,665 | 4/1978 | Burnett | 188/73.35 |
| 4,244,451 | 1/1981 | Johannesen | 188/73.45 |

FOREIGN PATENT DOCUMENTS

| | | | |
|---|---|---|---|
| 47-49516 | 12/1972 | Japan | 188/73.43 |
| 2039645 | 8/1980 | United Kingdom | 188/73.35 |

*Primary Examiner*—Douglas C. Butler
*Assistant Examiner*—R. R. Diefendorf
*Attorney, Agent, or Firm*—Paul David Schoenle; Ken C. Decker

[57] ABSTRACT

A floating-caliper disc brake (10) includes a non-rotating torque member (36) which carries the caliper (22) in fixed radial position relative to the disc (12) via a pair of resilient assemblies (50). The torque member and caliper each have matching grooves (44, 46) which, when placed in registry, define a pair of apertures (48) between the caliper and the arms (38, 40) of the torque member. The resilient assemblies are received in the apertures (48) so as to yieldably space apart the caliper and the torque member. Brake torque is transferred from the caliper to the torque member by abutment surfaces defined on the caliper and on the torque member. The resilient assemblies provide for ready axial movement of the caliper relative to the torque member in the brake release condition by providing a light spring force which centers the caliper between the arms of the torque member. A much larger spring force is provided by the resilient assemblies if the caliper moves to either side of the caliper-centered position so that the caliper does not rattle against the torque member arms incident to vibrations and road shocks caused by vehicle operation.

3 Claims, 6 Drawing Figures

DISC BRAKE CALIPER SUPPORT

This is a continuation of application Ser. No. 191,188, filed Sept. 26, 1980, now abandoned.

The invention relates to a floating caliper disc brake.

Floating caliper disc brakes include a rotor having friction faces on opposite sides thereof and a caliper straddling the rotor and cooperating with a pair of friction elements to urge the pair of friction elements into engagement with the friction faces on the rotor when a brake application is effected. Rotation of the rotor is retarded by the friction elements during a brake application. A non-rotating torque member carries the caliper and substantially prevents radial and circumferential movement of the caliper relative to the rotor. The caliper is movable, or floats, axially to a limited extent relative to the rotor and torque member.

A disc brake is known in accordance with U.S. Pat. No. 4,084,665 to Burnett in which the torque member includes a pair of circumferentially spaced arms which carry the caliper between them. The caliper and arms both define cooperating abutments which transfer brake torque from the caliper to the torque member and which limit the circumferential movement of the caliper relative to the torque member. The caliper is prevented from movement in the radial direction by a pair of pins which are inserted into axially-extending apertures defined between the torque member arms and the caliper. Matching grooves or slots in the torque member and caliper, when placed in registry, define the apertures. Limited axial movement of the caliper relative to the disc is made possible by sliding of the caliper along the pins.

With a brake of the kind illustrated by the Burnett patent, brake torque is transferred from the caliper to the torque member principally by the cooperating abutments of the caliper and torque member arms. Corrosion of the abutment surfaces causes resistance to sliding of the caliper relative to the torque member, with the result that an equal and even application of force to the friction elements is not achieved upon a brake application. In the brake disclosed in the Burnett patent, an attempt has been made to space apart the abutment surfaces in the brake release condition by the use of elastomeric rings on the pins so that corrosion of the abutment surfaces does not interfere with sliding of the caliper. Upon an application of the brake, the resilient elastomeric rings are distorted and the abutment surfaces contact and transfer brake torque to the torque member. However, because the caliper is spaced from the arms of the torque member when the brake is not applied, the caliper may rattle against the torque member arms responsive to vibrations and road shocks caused by operation of the vehicle. If the elastomeric rings are made rigid enough to prevent rattling of the caliper against the arms of the torque member during normal vehicle operation, the rings cause an undesirable resistance to axial movement of the caliper because they frictionally engage both the caliper and the torque member arms.

The invention as claimed is intended to remedy the drawbacks of prior disc brakes. Our invention provides a disc brake having the caliper suspended between and spaced from the abutment surfaces defined by the torque member arms. The caliper is suspended by a pair of resilient assemblies which are received in axial apertures defined by cooperating grooves in the caliper and torque member.

The resilient assemblies are each comprised of an elongated cylindrical split sleeve formed of a resilient material and a cylinder of elastomeric material received within the sleeve. In order to support the caliper between the torque member arms, the resilient assemblies are inserted into the axially-extending apertures defined between the caliper and the torque member arms. The elongated split sleeve is C-shaped in cross-section and is distorted slightly from its free shape when it is inserted into the aperture. A small amount of clearance exists between the split sleeve and the elastomeric cylinder when the resilient assembly is installed in the aperture so that the caliper is centered between the torque member arms by the spring forces provided by the resilient split sleeves.

Deformation of a split sleeve incident to radial or circumferential caliper movement allows a limited amount of movement for the caliper which is resisted only by the relatively low spring force provided by the split sleeve. As soon as the clearance between the elastomeric cylinder and the split sleeve is taken up, further circumferential movement of the caliper is resisted by the spring force provided by the cylinder of elastomeric material in combination with the split sleeve. Because the elastomeric material is distorted and compressed within the split sleeve as the caliper moves, its spring rate is very high and increases with increasing caliper movement and compression of the elastomeric material.

Our invention provides a disc brake having a caliper spaced from the arms of the torque member when the brake is not applied. When the caliper is in its centered or neutral position, the split sleeves provide a relatively low centering force to the caliper and the elastomeric cylinders within the sleeves are not compressed. Therefore, the caliper may slide easily along the split sleeves because the low centering force results in low frictional forces between the caliper and the sleeves. However, slight displacement of the caliper in either circumferential direction from its neutral position causes distortion and compression of one of the elastomeric cylinders and the creation of a high spring rate. Consequently, the caliper excursions caused by vehicle vibrations and road shocks are resisted by the higher spring rate provided by the elastomeric cylinders on either side of the caliper-centered position.

When the brake is applied, the caliper is carried in the direction of disc rotation until one of its abutment surfaces contacts a torque member arm. One of the resilient assemblies is distorted and compressed within its axial aperture such that the caliper may contact the torque member arm. However, compression of the elastomeric material of the resilient assembly provides a very high spring rate which increases as the caliper moves toward the torque member arm and compresses the elastomeric material within the sleeve. As a result, the circumferential velocity attained by the caliper is diminished so that the abutment surfaces of the caliper and torque member arm contact each other with a lessened impact.

The advantages offered by the invention are mainly that the caliper is centered between the arms of the torque member when the brake is not applied so that corrosion of the torque transmitting surfaces does not interfere with axial sliding of the caliper; the caliper is maintained in its centered position by relatively low spring forces so that the frictional forces created between the resilient assemblies and the caliper are small and do not inhibit free axial sliding of the caliper; movement of the caliper in either circumferential direction from its center position results in a high spring rate resisting further caliper movement so that vibrations and road shocks do not cause the caliper to rattle against the arms of the torque member; and the high spring rate provided by the resilient assembly as the caliper approaches abutment with one of the torque member arms during a brake application diminishes the impact of the caliper against the torque member arm. Further, because the split sleeve of the resilient assembly is a relatively small component part, it may be made of corrosion-resistant material without a substantial cost penalty. The prevention of corrosion on the split sleeve insures that the caliper will slide freely along the sleeve.

One way of carrying out the invention is described in detail below with reference to drawings which illustrate only one specific embodiment, in which.

Figure 1:
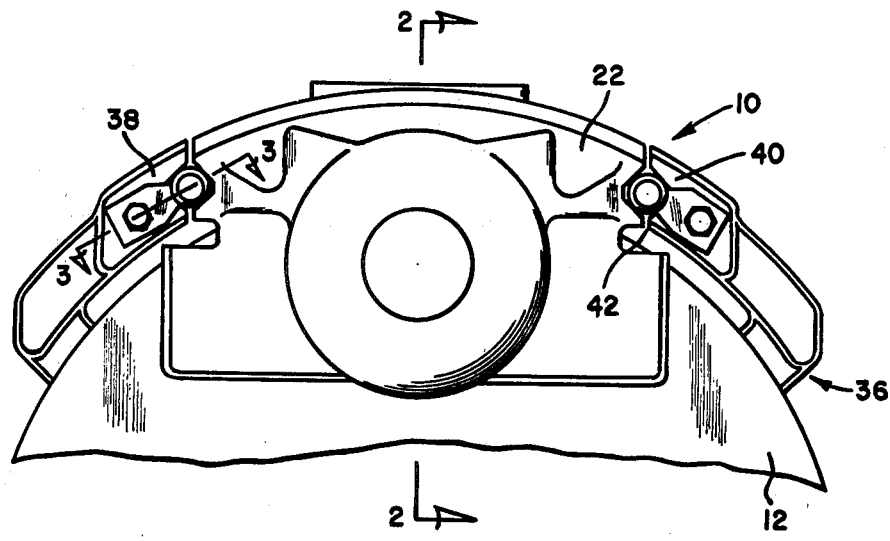
FIG. 1 is a fragmentary side elevation of a disc brake made pursuant to the present invention.
Figure 2:
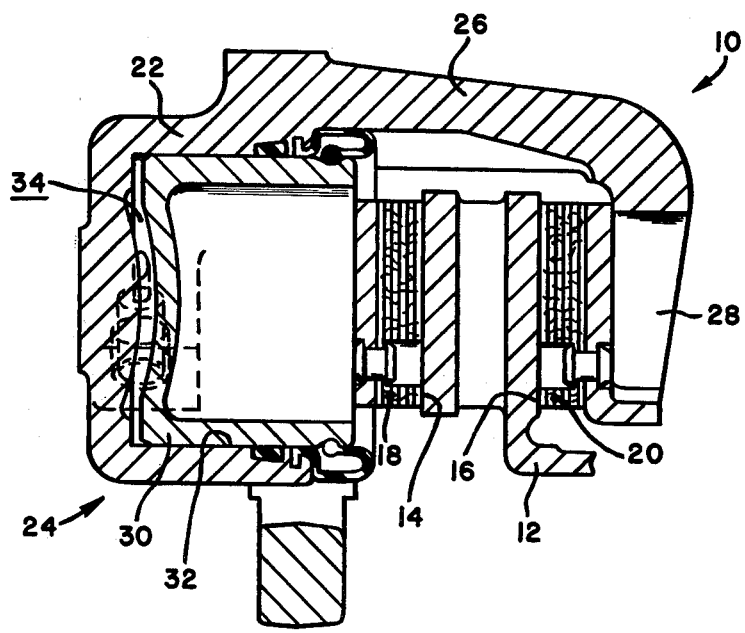
FIG. 2 is a cross-sectional view taken substantially slong line 2—2 of FIG. 1.

Referring to the Figures, a disc brake indicated generally by the numeral 10 includes a rotor 12 rotatable with an axle assembly (not shown) and having a pair of opposed friction faces 14 and 16. A pair of friction elements 18, 20 are disposed adjacent the friction faces 14 and 16, respectively. The friction elements 18 and 20 are urged into braking engagement with their corresponding friction faces 14 and 16 when a brake application is effected. A caliper 22 includes a fluid motor portion 24 disposed adjacent the friction face 14, a bridge portion 26 that traverses the periphery of the rotor 12, and a radially inwardly extending reaction portion 28 which is disposed adjacent the face 16. The fluid motor portion 24 includes a piston 30 slidably arranged in a bore 32 defined within caliper 22. Fluid is communicated to the variable volume chamber 34 defined between the end of the piston and corresponding end of the bore 32 when a brake application is effected, to urge the piston 30 toward the rotor 12. When the brake is subsequently released, the piston 30 is returned to its brake-release position.

Turning to FIG. 1, the caliper 22 is mounted for axial movement with respect to the rotor 12 by a torque member 36, which is secured to a non-rotating portion of the axle assembly (not shown). The torque member 36 includes a pair of circumferentially spaced arms 38, 40 that define a recess 42 therebetween.

Since the caliper mounting area of torque member 36 is symmetrical, the circumferentially spaced arms 38, 40 are similar, and therefore only the arm 38 will be described in detail, it being understood that the arm 40 is symmetrically opposite the arm 38.

The torque member arm 38 and the caliper 22 include matching slots or grooves 44, 46, respectively. Slots 44, 46 when placed in registry with each other, define an aperture 48 which extends axially between the arm 38 and caliper 22. In accordance with the invention, a resilient assembly 50 of generally circular cross-section is disposed between the arm 38 and the caliper 22 within the matching slots 44, 46 which define aperture 48. Resilient assembly 50 includes an elongated cylindrical split sleeve 52 which is formed of sheet metal and which is C-shaped in cross-section. In its free state, the split sleeve 52 defines an outer diameter which is slightly greater than the circular diameter definable within aperture 48 so that the sleeve is distorted within aperture 48 and provides a spring force tending to move the caliper 22 to the right in the figure. Received within split sleeve 52 is cylinder 54 formed of elastomeric material. The center portion of cylinder 54 has an outer diameter which is slightly less than the inner diameter defined by sleeve 52 when the sleeve is received in aperture 48. The end portions 56 of cylinder 54 are of a diameter greater than the center portion of the cylinder and cooperate with the center portion of the cylinder to define shoulders 58 which engage the sleeve 52 to prevent the cylinder from slipping out of the sleeve.

Figure 3:
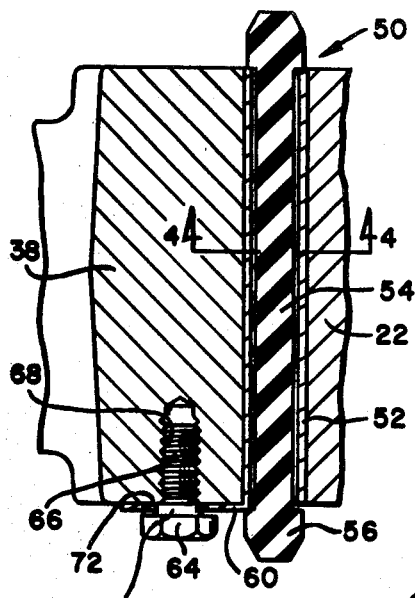
FIG. 3 is a cross-sectional view taken substantially along line 3—3 of FIG. 1.

Viewing FIG. 3, the reaction forces acting through bridge 26 move the caliper 22 in the direction indicated by the arrow C when a brake application is effected. In view of the relatively low spring force provided by split sleeve 52, the caliper 22 readily moves axially relative to torque member 38 because the friction forces between the sleeve and caliper are small. Additionally, braking torque developed by friction elements 18 and 20 during a brake application are transferred to caliper 22 and cause the caliper to move circumferentially through the clearance A and to anchor on the torque member arm 38.

Figure 6:
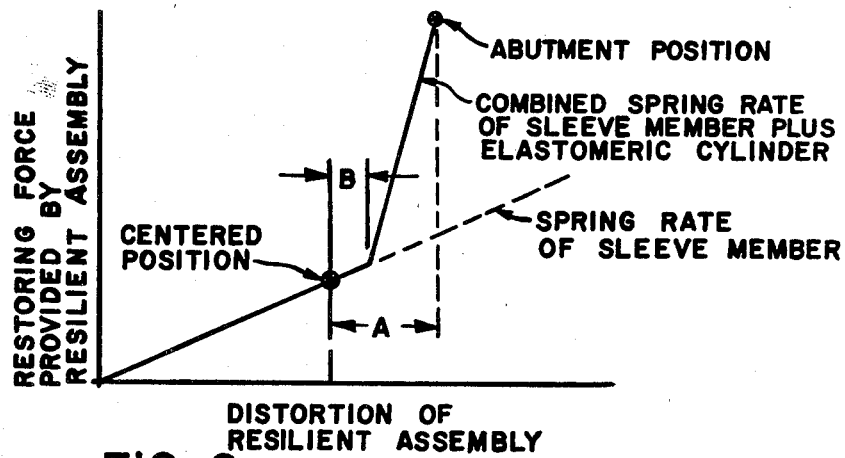
FIG. 6 is a graph which represents the deformation and spring rate of the resilient assembly.

Viewing FIG. 6, the resilient assembly 50 provides two distinctly different spring rates as the caliper moves through the clearance A between the centered position of the caliper and the abutment position. Initial movement of the caliper from its centered position toward the abutment position through the distance B is opposed only by the spring force provided by the split sleeve 52. The distance B represents the difference between the inner diameter defined by sleeve 52 and the outer diameter of the cylinder 54. When the caliper 22 has moved through the distance B, the inside of sleeve 52 contacts the outside of the cylinder 54 so that the spring rate of the cylinder is added to that of the sleeve and both together resist further movement of the caliper. For simplicity of illustration, the spring rate of cylinder 54 is graphically illustrated as a straight line in FIG. 6, which straight line represents a linear spring rate. In fact, the spring rate of cylinder 54 is exponential and increases as the cylinder of elastomeric material is distorted and compressed within sleeve 52. Because the spring rate provided by cylinder 54 is relatively high and increases as the caliper approaches the abutment position, the velocity of the caliper 22 at the time when the caliper contacts the torque member arm is lessened. In the brake release position, the caliper is lightly spring loaded toward its centered position by the resilient split sleeves 52. The caliper may move axially by sliding along the sleeves 52 without encountering high frictional resistance. However, road shocks and vibration which might cause the caliper to rattle against the torque member arms are resisted by the high spring rate provided by the elastomeric cylinders 54.

Sleeve 52 includes a tab 60 which projects radially and which lies adjacent to torque member arm 38. Tab 60 defines an aperture 62 which receives a shoulder bolt 64. Shoulder bolt 64 includes a threaded portion 66 which threadably engages a bore 68 in torque member arm 38. Shoulder bolt 64 further includes a shank portion 70 of increased diameter which cooperates with the threaded portion 66 to define a shoulder 72. Aperture 62 in tab 60 defines a diameter which is larger than the diameter of bolt portion 70. The distance between shoulder 72 and the head of bolt 64 is greater than the thickness of tab 60 so that the tab is movably retained adjacent to torque member arm 38 and resilient assembly 50 is retained in the aperture 48.

Figure 4:
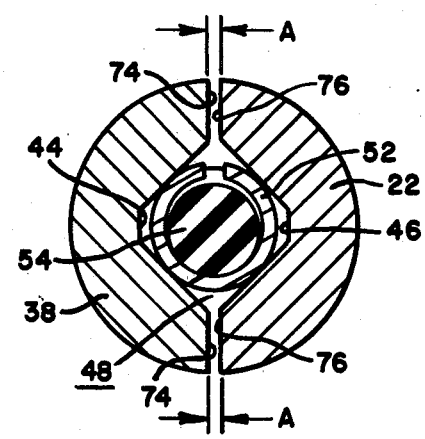
FIG. 4 is an enlarged cross-sectional view taken substantially along line 4—4 of FIG. 3.
Figure 5:
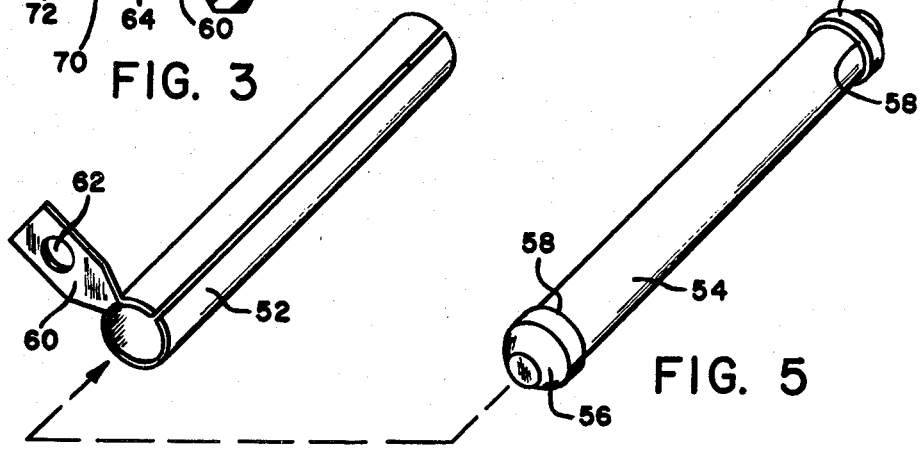
FIG. 5 is a perspective view of one of the resilient assemblies of the embodiment of FIGS. 1-4.

In the brake-release position, viewing FIG. 4, abutment surface 74 on the torque member arm 38 is spaced from an abutment surface 76 on the caliper 22 to form a clearance A between the torque member 36 and the caliper 22. The clearance A is maintained, in the brake-release position, by the engagement of the resilient split sleeve 52 with the torque member arm 38 and with the caliper 22. The clearance A is taken up on one side of the caliper 22 when the brake is applied and the caliper anchors on the torque member arm through the abutment surfaces 74, 76. With the caliper anchored to the torque member arm, the inner diameter defined by sleeve 52 is less than the undistorted outer diameter of the elastomeric cylinder 54. Consequently, cylinder 54 is distorted and compressed within sleeve 52. Because sleeve 52 is movably retained within the aperture 48 by the shoulder bolt 64, the sleeve is free to move resiliently within aperture 48 so as to allow the caliper 22 to move through the clearance A.

When a brake application is effected, high pressure fluid is admitted into the variable volume chamber 34 where it urges the piston 30 toward the friction face 14, thereby urging the friction element 18 into frictional engagement with the friction face 14. As is well known in the art, reaction forces acting through bridge 26 and the reaction portion 28 of the caliper 22 will also urge the friction element 20 into frictional engagement with the friction face 16 to brake or retard the rotation of the rotor 12.

Because the resilient split sleeve is required to provide only a relatively low spring force, it may be formed from materials which would not be suitable if a high spring rate were required. For example, the sleeve may be formed of stainless steel or plastic. Stainless steel and plastic also provide the added advantage of corrosion resistance.

In view of the above it will be seen that our invention provides a disc brake having the caliper spaced from the arms of the torque member so that in the brake-release position, the caliper may move axially despite corrosion of the torque transmitting abutments of the brake. Additionally, the caliper is lightly spring loaded to its centered position so that frictional forces between the caliper and the resilient assemblies are small. Rattling of the caliper against the torque member is resisted by the high spring rate provided by the cylinders of elastomeric material within the resilient assemblies. The high spring rate takes effect on either side of the caliper-centered position and further acts to limit the circumferential caliper velocity upon a brake application. Further, the split sleeve portion of the resilient assemblies may be made of corrosion-resistant material.

We claim:
1. A disc brake comprising:
a rotor having friction faces on opposite sides thereof and rotatable about an axis perpendicular to the plane of said rotor;
a caliper cooperating with a pair of friction element to urge the pair of friction elements into engagement with the friction faces on the rotor to retard rotation of said rotor;
a non-rotating torque member including a pair of circumferentially-spaced arms which define an opening therebetween, said caliper being received in said opening, said torque member arms having axially-extending grooves in registry with corresponding axially extending grooves in said caliper, said grooves cooperating to define a pair of axially-extending apertures between said torque member arms and said caliper;
a pair of resilient assemblies slidably disposed within said axially-extending apertures between said torque member arms and said caliper, one of said resilient assemblies comprising a split metal sleeve providing a first spring rate responsive to initial distortion of said one resilient assembly in a radial direction up to a predetermined amount, and an elastomeric cylinder providing a second additive spring rate which is higher than said first spring rate, said elastomeric cylinder being responsive to further distortion of said resilient assembly in the radial direction beyond the predetermined amount, said split metal sleeve and said elastomeric cylinder providing for circumferential movement of said caliper relative to said torque member in response to distortion of both said split metal sleeve and said elastomeric cylinder to permit said caliper to abut said torque member, said caliper sliding axially along said resilient assemblies and being substantially restrained from circumferential motion by the arms of said torque member, said second additive spring rate increasingly resisting movement of said caliper into abutment with said torque member to reduce the velocity of movement of said caliper at the time when said caliper abuts said torque member in order to diminish the impact during abutment.

2. The invention of claim 1 wherein said elastomeric cylinder for providing the second additive spring rate for said resilient assembly is received within said resilient member and the radial distortion (A) of said one resilient assembly is substantially shared such that said elastomeric cylinder is distorted about one half the distortion for said split metal sleeve when said caliper abuts said torque member.

3. The invention of claim 2 wherein said cylinder of elastomeric material defines a clearance with said split metal sleeve, said clearance corresponding to said predetermined distortion of said split metal sleeve, said split metal sleeve and said cylinder of elastomeric material cooperating to provide an increased spring rate for said resilient assembly upon distortion of said resilient member which takes up said clearance.

* * * * *